Jan. 20, 1959 S. DUINKER ET AL 2,870,267

ARRANGEMENT FOR SCANNING AND REPRODUCING MAGNETIC FIELDS

Filed May 28, 1954

INVENTORS
SIMON DUINKER
WILLEM KLAAS WESTMIJZE

BY [signature]

AGENT

United States Patent Office 2,870,267
Patented Jan. 20, 1959

2,870,267

ARRANGEMENT FOR SCANNING AND REPRODUCING MAGNETIC FIELDS

Simon Duinker and Willem Klaas Westmijze, Eindhoven, Netherlands, assignors, by mesne assignments, to North American Philips Company, Inc., New York, N. Y., a corporation of Delaware Application May 28, 1954, Serial No. 433,248

Claims priority, application Netherlands June 6, 1953

11 Claims. (Cl. 179—100.2)

The present invention relates to apparatus for scanning and reproducing magnetic fields. More particularly, the invention relates to an arrangement for scanning and reproducing magnetic fields containing a non-closed circuit made of magnetic material, part of this circuit consisting of two magnetically substantially identical and parallel branches made of material the polarization characteristic of which is non-linear. In the parallel branches fluxes are generated by means of one or more windings passing an alternating current at a constant fundamental frequency produced by an alternating current supply connected to these windings which drives the parallel branches into the non-linear part of their polarization characteristic, the components of these fluxes at the said fundamental frequency compensating for each other in the non-split part.

Such arrangements form a combination of a magnetic recorder scanning head or magnetometer and of a magnetic modulator. The magnetic flux generated in the parallel branches by the alternating current is modulated by the scanned magnetic fields. This modulated magnetic flux or components thereof is converted with the aid of a winding, arranged so as to surround the magnetic circuit, into an alternating voltage which after detection produces a current or voltage proportional to the scanned magnetic field. Compared with a normal magnetic recorder scanning head or magnetometer these arrangements have an advantage in that the current or voltage which is a measure of the scanned magnetic fields is substantially frequency-independent with the result that even very low frequencies and constant fields can be scanned and reproduced without difficulty. In addition, an amplifier stage can usually be dispensed with.

In known arrangements, fluxes are generated in the two branches by means of windings arranged so as to surround these branches and passing alternating currents of which fluxes the odd harmonics compensate for each other in the non-split part of the circuit with the result that in this part, if a field required to be reproduced is active, only flux components will be present the frequencies of which are even multiples of the fundamental frequency of the magnetic flux present in a parallel branch. In such arrangements, the output voltage is taken from a winding arranged so as to surround the non-split part of the magnetic circuit. This output voltage consists of modulated oscillations with surpressed carrier waves. The frequencies of these carrier waves consequently are even multiples of the fundamental frequency of the magnetic flux present in a parallel branch. Consequently, in order to detect the desired components of this output voltage, usually that component the carrier wave frequency of which is twice the said fundamental frequency, the associated carrier wave itself must be added at correct phase to this signal to obtain current or voltage which is proportional to the scanned magnetic field. In this connection, it should be noted that with magnetic amplifiers in analogous cases the signal required to be amplified is superposed on a direct current bias magnetization so that the carrier wave also is present in the output voltage. This method cannot be employed in this event since this direct current bias magnetization field in the case of a magnetometer acts upon the field required to be scanned in and unpredictable manner and in the case of a magnetic recorder scanning head not only acts upon the signal recorded on a tape but also produces an undesirable noise in the sound to be reproduced ultimately.

It is an object of the invention to provide an arrangement in which the carrier wave itself is present in the output signal without the direct current bias magnetization field required acting upon the magnetic field required to be scanned. In accordance with the invention, in the parallel branches direct current fluxes are generated by suitable means which fluxes also compensate for each other in the non-split part and the output circuit of the arrangement coupled to the parallel branches by means of windings wound on these branches imposes an equal load thereon.

In order that the invention may be readily carried into effect, it will now be explained with reference to the accompanying drawing, in which.

Figure 1:
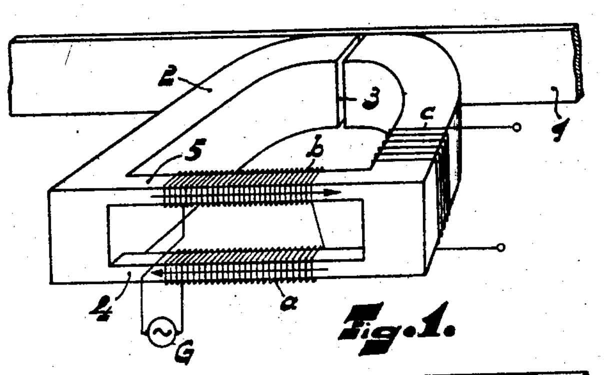
Fig. 1 is a schematic diagram of known apparatus for scanning and reproducing magnetic fields.

Fig. 1 is a known arrangement of the kind used in a magnetic recorder as a reproducing head. Reference numeral 1 designates the magnetic tape comprising the magnetic field required to be scanned and to be reproduced acoustically. Reference numeral 2 represents the magnetic circuit comprising a field gap 3 and two parallel magnetically substantially identical branches 4 and 5 made of a material the polarization curve of which is non-linear. The term "magnetically identical branches" is to be understood to mean branches the polarization characteristics, reluctance, etc. of which are identical. *a* and *b* are identical windings wound in a sense such that if the component at fundamental frequency of the flux generated by the alternating current generator G exhibits the direction shown by the arrow in the branch 4, this component has the opposite direction in the branch 5.

If no field required to be scanned is present, no flux will be present in the non-split part of the magnetic circuit, for example at the point of the output winding *c*, as is well known. However, if a field is present, a modulated flux is set up in the non-split part and consequently also at the point of the winding *c*. The components of these fluxes, each modulated by the magnetic fields required to be reproduced, have carrier wave frequencies which are even multiples of the fundamental frequency of the flux generated by the generator G in the parallel branches. The carrier waves themselves, however, are entirely rejected and this gives rise to the aforementioned difficulties.

Figure 2:
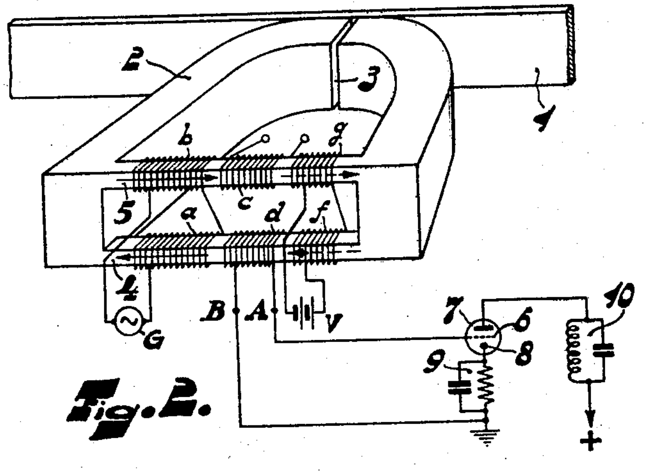
Fig. 2 is a schematic diagram of an embodiment of the apparatus of the present invention.

Fig. 2 shows an arrangement according to the invention. Corresponding parts of this arrangement are designated similarly to those shown in Fig. 1. In Fig. 2, two identical windings *f* and *g* connected to the direct voltage supply V are arranged so as to surround the two branches. The direct current flux thus generated is indicated by the arrows shown as broken lines. However, no direct current flux is produced in the non-split part of the magnetic circuit and in the field gap 3, for the branches 4 and 5 are magnetically identical similarly to the windings *f* and *g* so that the direct current fluxes compensate for each other in the remainder of the circuit. It will be understood that the direct current bias magnetization may also be generated in various different ways. For example, the direct current supply V may be replaced by a unidirectionally conductive element which may comprise a smoothing network or the generator G supplies an alternating current which also contains a direct current component. In this event the windings *f* and *g* may be omitted.

Across each of the windings *d* and *c* a voltage is set up the components of which have frequencies which are equal to the fundamental frequency of the alternating current generated by the generator G and the higher harmonics thereof, each component being amplitude-modulated by a signal proportional to the scanned magnetic field. If no field is present, this voltage is also applied across the windings, the components, however, in this case obviously not being modulated. Consequently such voltages can be detected without addition of a carrier wave. However, it is not possible to connect a detector arrangement to, for example, the winding *d* without further expedients, since the current which in this event passes this winding imposes a load on the branch concerned and consequently causes a variation of the reluctance of said branch. Thus, the direct current fluxes in the two branches no longer compensate for each other in the remainder of the circuit, with the result that not only direct current flux but also flux the frequency of which is equal to the fundamental frequency of the alternating current generated by the generator G and to odd harmonics thereof penetrate into the non-split part of the magnetic circuit and into the field gap 3. This can be avoided by connecting the winding *d* to an element which at least approximately consumes no current. Said winding may, for example, be connected to the control grid and the cathode of an amplifier tube associated with an amplifier stage, preferably a selective amplifier stage. In Fig. 2, a terminal A of the winding *d* is connected to the control grid 6 of an amplifier tube 7 and a terminal B to the cathode 8 via an RC-network 9 which acts to adjust the grid bias voltage. The anode circuit includes the circuit 10 which is tuned to the frequency of the components required to be detected.

It is, however, also possible for the modulated voltages to be detected without use being made of an amplifier stage, for example, in that the winding *c* wound on the other branch has an equal load imposed on it as the winding *d*, for example, a detector arrangement, the two detected voltages being combined, if required. This also permits a lack of balance which may exist between the branches to be compensated for in that a slightly different load is imposed on the windings *d* and *c*, which effect is also obtainable by the use of various other known methods, for example, in that the turns ratio of the windings *a* and *b* is arranged to be slightly different or in that one of the windings *a* and *b* is bridged by means of a resistor, which methods obviously can also be used if amplification is provided previously.

Figure 3:
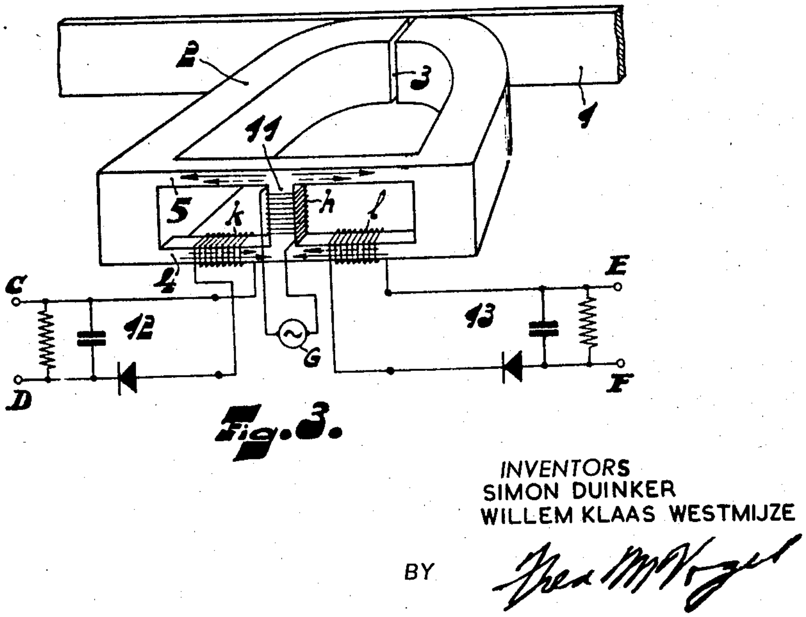
Fig. 3 is a schematic diagram of another embodiment of the apparatus of the present invention.

Fig. 3 shows an arrangement enabling the voltages induced by the fluxes to be directly detected. Corresponding parts of this arrangement are again designated similarly to those shown in Figs. 1 and 2. In addition, in Fig. 3, the fluxes are produced in a manner different from that used in the arrangements shown in Figs. 1 and 2, in that a winding *h* which passes alternating current is wound on a bridge 11 which bridges the mid-points of the two parallel branches. This results in the components of the fundamental frequencies compensating for each other in the non-split part. The arrows show the course of the fluxes in the branches at a given instant. In Fig. 3 both parts of the branch 4 have windings *k* and *l* wound on them which are connected to identical detector arrangements 12 and 13 in a manner such that the direct current components produced by said detector arrangements set up direct current fluxes in the two parts of the branch 4 which are equal in value but opposite in direction. Since these direct current fluxes are closed each across a part of the branch 5 and the bridge 11, no direct current fluxes will be set up in the non-split part of the magnetic circuit and in addition the two branches thus have an equal load imposed on them. In many cases, the amount of the direct current flux generated by the detector arrangements is sufficient for a satisfactory effect of the arrangement. If desired, a direct current flux may also be produced by means of a winding which is wound on the bridge 11 and passes direct current. The desired signal can in this event be taken from each of the pairs of terminals C—D and E—F; if required, the two output voltages may be combined.

It will be understood that it is also possible to arrange one of the windings *k* and *l* so as to surround one of the parts in which the branch 5 is divided by the bridge 11, provided that care is taken to ensure that the direct current fluxes compensate for each other in the non-split part. In this event an equal load is imposed on both branches.

While the invention has been described by means of specific examples and in specific embodiments, we do not wish to be limited thereto, for obvious modifications will occur to those skilled in the art without departing from the spirit and scope of the invention.

What is claimed is:

1. Apparatus for scanning and reproducing magnetic fields, comprising a magnetic member having first and second magnetic portions, said first portion having polar extremities defining a gap, said second portion comprising a magnetic material having a non-linear polarization characteristic and comprising two substantially magnetically identical parallel branches, said first and second portions defining a first magnetic path and said two branches defining a second substantially closed magnetic path, a winding coupled to said branches for generating in said substantially closed path alternating fluxes which are balanced with respect to the magnetic path through said first portion, a source of alternating current of given frequency coupled to said winding and having an intensity driving the material of said parallel branches into the non-linear part of its polarization characteristic, means for producing in said substantially closed path a direct current flux which is balanced with respect to the said path through said first portion, and a signal output winding coupled to one of said portions.

2. Apparatus as claimed in claim 1, wherein said signal output winding comprises a winding section linking one of said branches.

3. Apparatus as claimed in claim 2, further comprising a high input impedance amplifier system connected to said winding section.

4. Apparatus as claimed in claim 1, wherein said means for producing a direct current flux comprises two windings each linking one of said branches, said windings being poled to produce in said branches oppositely directed equal fluxes.

5. Apparatus as claimed in claim 1, wherein said winding for generating alternating fluxes comprises two winding sections, each of said sections linking one of said branches, said windings being poled to produce in said branches oppositely directed equal fluxes.

6. Apparatus as claimed in claim 1, further comprising a third branch interconnecting said two branches at portions intermediate the ends thereof, and wherein said winding for generating alternating fluxes comprises a winding linking said third branch.

7. Apparatus as claimed in claim 1, wherein said means for producing a direct current flow comprises a winding linking one of said branches, an alternating current circuit connected to said winding, and a rectifier element connected in said alternating current circuit.

8. Apparatus as claimed in claim 1, wherein said output winding comprises two winding sections each linking one of said branches.

9. Apparatus as claimed in claim 8, further comprising signal output circuits connected to each of said winding sections, and wherein said means for producing a direct current flux comprises a rectifier element connected in each of said output circuits.

10. Apparatus for scanning and reproducing magnetic fields, comprising a magnetic member having first and second magnetic portions, said first portion having polar extremities defining a gap, said second portion comprising a magnetic material having a non-linear polarization characteristic and comprising first and second substantially magnetically identical parallel branches, said first and second portions defining a first magnetic path and said two branches defining a second substantially closed magnetic path, first and second windings linking said first and second branches respectively, a source of alternating current of given frequency coupled to said windings and having an intensity driving the material of said branches into the non-linear part of its polarization characteristic, said windings being poled to produce in said substantially closed path fluxes which are balanced with respect to the magnetic path through said first portion, third and fourth windings linking said first and second branches respectively, means connected to said last-mentioned windings to produce a direct current flux in said branches, said last-mentioned windings being poled to produce in said branches oppositely directed equal fluxes, a fifth winding linking one of said branches, and a high input impedance signal amplifier system connected to said fifth winding.

11. Apparatus for scanning and reproducing magnetic fields, comprising a magnetic member having first and second magnetic portions, said first portion having polar extremities defining a gap, said second portion comprising a magnetic material having a non-linear polarization characteristic and comprising first and second substantially identical parallel branches spaced apart and having the ends thereof interconnected, a third branch of magnetic material interconnecting said two branches at portions intermediate the ends thereof, said first and second portions defining a first magnetic path, said first and second branches defining a substantially closed magnetic path, and said third branch defining a second substantially closed magnetic path with said first and second branches, a first winding linking said third branch, a source of alternating current coupled to said first winding and having an intensity driving the material of said first and second branches into the non-linear part of its polarization characteristic, second and third windings linking one of said first-mentioned branches, rectifier means connected to said last-mentioned windings for producing a direct current flux in said first and second branches, said last-mentioned windings being poled relative to said rectifier means to produce oppositely directed equal fluxes in said first and second branches, and signal output means coupled to one of said last-mentioned windings.

References Cited in the file of this patent

UNITED STATES PATENTS

| | | |
|---|---|---|
| 2,536,260 | Burns | Jan. 2, 1951 |
| 2,608,621 | Peterson | Aug. 26, 1952 |

FOREIGN PATENTS

| | | |
|---|---|---|
| 737,497 | Great Britain | Sept. 28, 1955 |